US010075336B2

(12) United States Patent
Rao et al.

(10) Patent No.: US 10,075,336 B2
(45) Date of Patent: Sep. 11, 2018

(54) PARAMETER ADJUSTMENT METHOD AND APPARATUS

(71) Applicant: Huawei Technologies Co., Ltd., Shenzhen, Guangdong (CN)

(72) Inventors: Shuicai Rao, Nanjing (CN); Deping Dong, Nanjing (CN); Qinxue Wu, Nanjing (CN); Mincai Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 971 days.

(21) Appl. No.: 14/522,406

(22) Filed: Oct. 23, 2014

(65) Prior Publication Data
US 2015/0124580 A1    May 7, 2015

(30) Foreign Application Priority Data
Nov. 4, 2013  (CN) .......................... 2013 1 0539018

(51) Int. Cl.
H04L 29/00    (2006.01)
H04L 12/24    (2006.01)
H04L 12/26    (2006.01)
H04L 1/00     (2006.01)
H04L 1/24     (2006.01)
H04L 25/03    (2006.01)

(52) U.S. Cl.
CPC ........ H04L 41/0816 (2013.01); H04L 1/0001 (2013.01); H04L 1/241 (2013.01); H04L 25/03 (2013.01); H04L 41/0836 (2013.01); H04L 43/0817 (2013.01); H04L 43/0829 (2013.01)

(58) Field of Classification Search
CPC ................................................. H04L 41/0816
See application file for complete search history.

(56) References Cited

U.S. PATENT DOCUMENTS

2005/0154953 A1   7/2005  Norskog
2008/0294296 A1  11/2008  Liu et al.
2011/0241807 A1  10/2011  Matsui
2012/0044983 A1   2/2012  Kerr
(Continued)

FOREIGN PATENT DOCUMENTS

CN    1642118 A    7/2005
CN  102938650 A    2/2013

Primary Examiner — John Breene
Assistant Examiner — Jeffrey C Morgan
(74) Attorney, Agent, or Firm — Leydig, Voit & Mayer, Ltd.

(57) ABSTRACT

A parameter adjustment method and apparatus are provided. The parameter adjustment method for a communication device with a SerDes link includes: acquiring, by the communication device, a current ambient temperature of the communication device; and if according to a preset correspondence between a temperature range and a parameter, the current ambient temperature is determined to be not corresponding to a SerDes parameter of the communication device, adjusting the SerDes parameter of the communication device according to the correspondence. The SerDes parameter of the communication device is adjusted in real time, thereby improving reliability of a SerDes link of the communication device, and reducing a bit error rate of the SerDes link.

8 Claims, 4 Drawing Sheets

(56) References Cited

U.S. PATENT DOCUMENTS

2013/0138830 A1* 5/2013 Fang .................... H04L 47/263
709/233
2015/0236928 A1* 8/2015 Drake ................ H04L 41/0816
709/224

* cited by examiner

PARAMETER ADJUSTMENT METHOD AND APPARATUS

CROSS-REFERENCE TO RELATED APPLICATION

This application claims priority to Chinese Patent Application No. 201310539018.4, filed on Nov. 4, 2013, which is hereby incorporated by reference in its entirety.

TECHNICAL FIELD

The application relates to communications technologies, and in particular to a parameter adjustment method and apparatus.

BACKGROUND

With continuous development of networks, enterprises and operators demand increasingly high bandwidth, and therefore, communication devices need to undertake increasingly heavy traffic. Serializer/deserializer (SerDes) links are used more and more widely in communication due to advantages such as strong interference immunity, low power consumption, and good signal integrity.

However, signals on the SerDes links significantly attenuate under such a circumstance as a far transmission distance or a high temperature. As a result, communication devices at both ends of a SerDes link need to process signals according to SerDes parameters. Generally, after design of a transmit end and a receive end is complete, the transmit end and the receive end need to traverse all SerDes parameters under a normal temperature circumstance, perform a pseudo-random binary sequence (PRBS) test, select an optimal SerDes parameter according to an error-free code interval, and verify whether a margin of the optimal SerDes parameter is enough under circumstances of high temperatures and low temperatures. If the margin is enough, the optimal SerDes parameter is used to configure a chip.

However, as a length of the SerDes link increases, a margin of a parameter becomes smaller; therefore, reliability of the SerDes link decreases.

SUMMARY

The application provides a parameter adjustment method and apparatus, to improve reliability of a SerDes link.

According to a first aspect, an embodiment of the application provides a parameter adjustment method, applicable to a communication device including a SerDes link, where the method includes:

acquiring, by the communication device, a current ambient temperature of the communication device; and if it is determined, according to a preset correspondence between a temperature range and a parameter, that the current ambient temperature does not match a SerDes parameter of the communication device, adjusting the SerDes parameter of the communication device according to the correspondence.

In a first possible implementation manner of the first aspect, the correspondence between a temperature range and a parameter includes: a first correspondence, a second correspondence, and a third correspondence, where the first correspondence includes a high temperature range and a first SerDes parameter, the second correspondence includes a normal temperature range and a second SerDes parameter, and the third correspondence includes a low temperature range and a third SerDes parameter.

According to the first possible implementation manner of the first aspect, in a second possible implementation manner of the first aspect, the adjusting the SerDes parameter of the communication device according to the correspondence specifically includes:

if the current ambient temperature falls within the high temperature range, adjusting the SerDes parameter of the communication device to be the first SerDes parameter; or if the current ambient temperature falls within the normal temperature range, adjusting the SerDes parameter of the communication device to be the second SerDes parameter; or if the current ambient temperature falls within the low temperature range, adjusting the SerDes parameter of the communication device to be the third SerDes parameter.

According to the first or the second possible implementation manner of the first aspect, in a third possible implementation manner of the first aspect, before the acquiring, by a communication device, a current ambient temperature of the communication device, the method further includes:

by using a SerDes link of the communication device, performing a pseudo-random binary sequence PRBS test on each one of the high temperature range, the normal temperature range, and the low temperature range by using a plurality of groups of sample SerDes parameters, to: in the plurality of groups of sample SerDes parameters, determine, for the high temperature range, a SerDes parameter with a greatest corresponding error-free code interval and a margin that falls within a set range as the first SerDes parameter; determine, for the normal temperature range, a SerDes parameter with a greatest corresponding error-free code interval and a margin that falls within a set range as the second SerDes parameter; and determine, for the low temperature range, a SerDes parameter with a greatest corresponding error-free code interval and a margin that falls within a set range as the third SerDes parameter.

According to the first aspect and any one of the first to the third possible implementation manners of the first aspect, in a fourth possible implementation manner of the first aspect, the acquiring, by the communication device, a current ambient temperature of the communication device includes:

monitoring a packet loss rate of the SerDes link of the communication device; and if the packet loss rate is greater than a set threshold, acquiring the current ambient temperature of the communication device.

According to a second aspect, an embodiment of the application provides a parameter adjustment apparatus, applicable to a communication device including a SerDes link, where the apparatus includes:

an acquiring module, configured to acquire a current ambient temperature of the communication device; and a processing module, configured to: if it is determined, according to a preset correspondence between a temperature range and a parameter, that the current ambient temperature does not match a SerDes parameter of the communication device, adjust the SerDes parameter of the communication device according to the correspondence.

In a first possible implementation manner of the second aspect, the correspondence between a temperature range and a parameter includes: a first correspondence, a second correspondence, and a third correspondence, where the first correspondence includes a high temperature range and a first SerDes parameter, the second correspondence includes a normal temperature range and a second SerDes parameter, and the third correspondence includes a low temperature range and a third SerDes parameter.

According to the first possible implementation manner of the second aspect, in a second possible implementation manner of the second aspect, the processing module is specifically configured to:

if the current ambient temperature falls within the high temperature range, adjust the SerDes parameter of the communication device to be the first SerDes parameter; or if the current ambient temperature falls within the normal temperature range, adjust the SerDes parameter of the communication device to be the second SerDes parameter; or if the current ambient temperature falls within the low temperature range, adjust the SerDes parameter of the communication device to be the third SerDes parameter.

According to the first or the second possible implementation manner of the second aspect, in a third possible implementation manner of the second aspect, the apparatus further includes:

a determining module, configured to: by using a SerDes link of the communication device, perform a pseudo-random binary sequence PRBS test on each one of the high temperature range, the normal temperature range, and the low temperature range by using a plurality of groups of sample SerDes parameters, to: in the plurality of groups of sample SerDes parameters, determine, for the high temperature range, a SerDes parameter with a greatest corresponding error-free code interval and a margin that falls within a set range as the first SerDes parameter; determine, for the normal temperature range, a SerDes parameter with a greatest corresponding error-free code interval and a margin that falls within a set range as the second SerDes parameter; and determine, for the low temperature range, a SerDes parameter with a greatest corresponding error-free code interval and a margin that falls within a set range as the third SerDes parameter.

According to the second aspect and any one of the first to the third possible implementation manners of the second aspect, in a fourth possible implementation manners of the second aspect, the acquiring module is specifically configured to:

monitor a packet loss rate of the SerDes link of the communication device; and if the packet loss rate is greater than a set threshold, acquire the current ambient temperature of the communication device.

According to the embodiments of the application, a current ambient temperature of a communication device including a SerDes link is monitored in real time, and a SerDes parameter configured for the communication device is adjusted according to the current ambient temperature and a preset correspondence between a temperature range and a SerDes parameter of the communication device, thereby improving reliability of the SerDes link of the communication device, and reducing a bit error rate of the SerDes link.

BRIEF DESCRIPTION OF DRAWINGS

To describe the technical solutions in the embodiments of the application more clearly, the following briefly introduces the accompanying drawings required for describing the embodiments. Apparently, the accompanying drawings in the following description show some embodiments of the application, and a person of ordinary skill in the art may still derive other drawings from these accompanying drawings without creative efforts.

DESCRIPTION OF EMBODIMENTS

To make the objectives, technical solutions, and advantages of the embodiments of the application clearer, the following clearly describes the technical solutions in the embodiments of the application with reference to the accompanying drawings in the embodiments of the application. Apparently, the described embodiments are a part rather than all of the embodiments of the application. All other embodiments derived by persons of ordinary skill in the art based on the embodiments of the application without creative efforts shall fall within the protection scope of the application.

Figure 1:
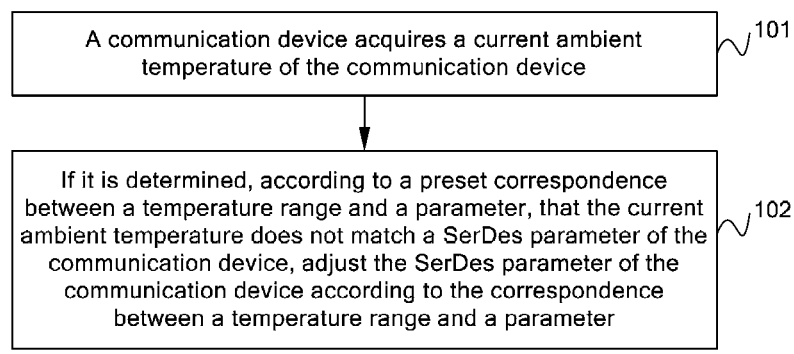
FIG. 1 is a flowchart of a parameter adjustment method according to an embodiment of the application.

FIG. 1 is a flowchart of a parameter adjustment method according to an embodiment of the application. The method may be applicable to a communication device including a SerDes link, where the communication device may be a switch, a router, a laptop computer, a repeater, or the like, and the method may be specifically implemented by using software, hardware, or a combination of software and hardware. The method specifically includes the following steps:

101: The communication device acquires a current ambient temperature of the communication device.

During a normal operation process, the communication device may periodically acquire the current ambient temperature of the communication device. For example, the current ambient temperature of the communication device is acquired at regular intervals. Optionally, the current ambient temperature of the communication device may also be acquired by triggering an event, for example, a packet loss rate of a SerDes link is monitored; and if the packet loss rate is greater than a set threshold, the current ambient temperature of the communication device is acquired. By acquiring the current ambient temperature of the communication device in an event triggering manner, a scenario in which an ambient temperature changes significantly between two periods of periodically acquiring the current ambient temperature may be avoided, thereby further improving reliability of the SerDes link of the communication device.

Whether packet loss occurs may be determined by monitoring a specific numeric value of an error packet counter of the SerDes link. If the numeric value of the error packet counter is non-zero, data packet loss occurs on the SerDes link, and the current ambient temperature of the communication device is acquired; and if the numeric value of the error packet counter is zero, data packet loss does not occur on the SerDes link, and the current ambient temperature of the communication device does not need to be acquired.

102: If it is determined, according to a preset correspondence between a temperature range and a parameter, that the current ambient temperature does not match a SerDes parameter of the communication device, the SerDes parameter of the communication device is adjusted according to the correspondence between a temperature range and a parameter.

Figure 2:
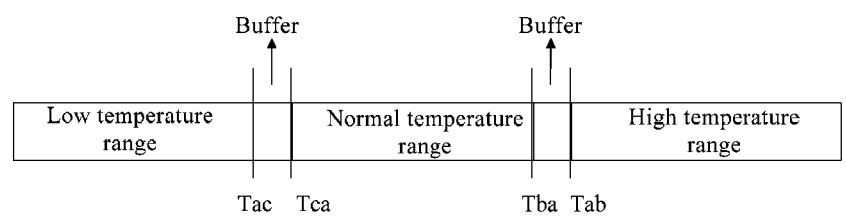
FIG. 2 is an exemplary diagram of temperature range division in a parameter adjustment method according to an embodiment of the application.

In the embodiment of the application, temperatures are divided into several different temperature ranges according to thresholds. For example, as shown in FIG. 2, a value less than Tac falls within a low temperature range, a value from Tca to Tba falls within a normal temperature range (including two critical points), and a value greater than Tab falls within a high temperature range. Tac represents a threshold temperature value for adjusting from a normal temperature to a low temperature, Tca represents a threshold temperature value for adjusting from a low temperature to a normal temperature, Tba represents a threshold temperature value for adjusting from a high temperature to a normal temperature, and Tab represents a threshold temperature value for adjusting from a normal temperature to a high temperature. One buffer exists between the low temperature range and the normal temperature range, and one buffer also exists between the normal temperature range and the high temperature range. Optionally, if Tac is equal to Tca, there is no buffer between the low temperature range and the normal temperature range, and if Tba is equal to Tab, there is no buffer between the normal temperature range and the high temperature range. Preferably, if Tac is unequal to Tca and Tba is unequal to Tab, that is, a buffer exists between the two temperature ranges. Such settings may avoid a scenario in which the SerDes parameter of the communication device jumps instantaneously and frequently within a short time period due to temperature instability, thereby ensuring normal operation of the communication device.

Figure 1A:
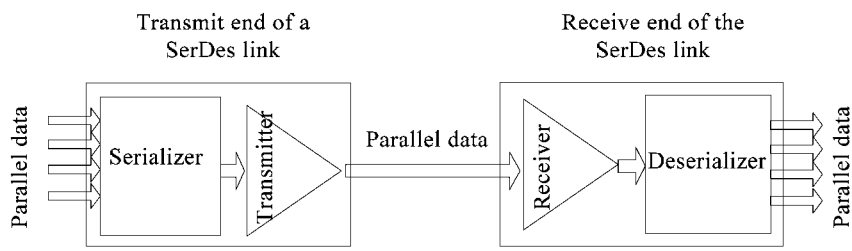
FIG. 1a is an exemplary diagram of a SerDes link according to an embodiment of the application.

The high temperature range, the normal temperature range, and the low temperature range separately correspond to a group of SerDes parameters, including a pre-emphasis coefficient and a pre-equalization coefficient. For example, both ends of the SerDes link shown in FIG. 1a, namely a transmit end of the SerDes link and a receive end of the SerDes link, need to process signals according to the SerDes parameter. Specifically, the transmit end of the SerDes link pre-processes a to-be-sent serial signal by using the pre-emphasis coefficient, and the receive end of the SerDes link performs compensation for a received serial signal by using the pre-equalization coefficient, to acquire more accurate data. It may be understood that, one communication device generally includes a transmit end of a SerDes link and a receive end of the SerDes link, where the transmit end of the SerDes link sends a serial signal to another communication device, and the receive end of the SerDes link receives a serial signal sent by another communication device.

The correspondence between a temperature range and a parameter may specifically includes: a first correspondence, a second correspondence, and a third correspondence, where the first correspondence includes a high temperature range and a first SerDes parameter, and the first SerDes parameter includes a first pre-emphasis coefficient and a first pre-equalization coefficient; the second correspondence includes a normal temperature range and a second SerDes parameter, and the second SerDes parameter includes a second pre-emphasis coefficient and a second pre-equalization coefficient; and the third correspondence includes a low temperature range and a third SerDes parameter, and the third SerDes parameter includes a third pre-emphasis coefficient and a third pre-equalization coefficient.

The first SerDes parameter, the second SerDes parameter, and the third parameter may be the same or different.

In the correspondence between a temperature range and a parameter, division of temperature ranges is not limited to the division shown in FIG. 2, and may be set according to a user requirement; and SerDes parameters corresponding to different temperature ranges may be the same or different, which is not limited herein.

After the current ambient temperature of the communication device is acquired, it is determined, according to the correspondence between a temperature range and a parameter, whether the current ambient temperature matches the SerDes parameter of the communication device.

Specifically, a SerDes parameter corresponding to the current ambient temperature may be acquired according to the correspondence between a temperature range and a parameter, for example, the first SerDes parameter. If the SerDes parameter corresponding to the current ambient temperature is inconsistent with the SerDes parameter of the communication device, the current ambient temperature does not match the SerDes parameter of the communication device; and if the SerDes parameter corresponding to the current ambient temperature is consistent with the SerDes parameter of the communication device, the current ambient temperature matches the SerDes parameter of the communication device. Alternatively, a temperature range corresponding to the SerDes parameter of the communication device may also be acquired according to the correspondence between a temperature range and a parameter. If the current ambient temperature is not within the temperature range corresponding to the SerDes parameter of the communication device, the current ambient temperature does not match the SerDes parameter of the communication device; and if the current ambient temperature falls within the temperature range corresponding to the SerDes parameter of the communication device, the current ambient temperature matches the SerDes parameter of the communication device.

If the current ambient temperature does not match the SerDes parameter of the communication device, the SerDes parameter of the communication device is adjusted according to the correspondence between a temperature range and a parameter. If the current ambient temperature matches the SerDes parameter of the communication device, step 101 is performed, that is, the current ambient temperature of the communication device is acquired periodically or in an event triggering manner.

Optionally, if monitoring the specific numeric value of the error packet counter of the SerDes link to determine whether packet loss occurs and whether to acquire the current ambient temperature of the communication device, the numeric value of the error packet counter is reset to zero after the determining is performed, so that whether to acquire the current ambient temperature of the communication device is determined subsequently in such a manner.

For example, after a communication device such as a switch completes initialization, a default parameter is configured for a SerDes link of the switch, where the default parameter may be the foregoing first SerDes parameter, the second SerDes parameter, or the third SerDes parameter. The switch acquires a current ambient temperature of the switch, and determines, according to the preset correspondence between a temperature range and a parameter, whether the currently configured SerDes parameter of the switch matches the current ambient temperature of the switch. If the currently configured SerDes parameter of the switch does not match the current ambient temperature of the switch, the switch adjusts the SerDes parameter of the switch according to the correspondence between a temperature range and a parameter. For example, a numeric value of a register is modified by using a main control board, to implement adjustment of the SerDes parameter of the switch.

In the embodiment of the application, a current ambient temperature of a communication device that performs communication by using a SerDes link is monitored in real time, and a SerDes parameter of the communication device is adjusted according to the current ambient temperature and a preset correspondence between a temperature range and a parameter, thereby improving reliability of the SerDes link of the communication device, and reducing a bit error rate of the SerDes link.

Further, the adjusting a SerDes parameter of the communication device according to a correspondence includes:

if the current ambient temperature falls within a high temperature range, adjusting the SerDes parameter of the communication device to be a first SerDes parameter, so that a transmit end of the SerDes link of the communication device pre-processes a to-be-sent serial signal by using a first pre-emphasis coefficient, and a receive end of the SerDes link of the communication device performs compensation for a received serial signal by using a first pre-equalization coefficient;

if the current ambient temperature falls within a normal temperature range, adjusting the SerDes parameter of the communication device to be a second SerDes parameter, so that the transmit end of the SerDes link of the communication device pre-processes a to-be-sent serial signal by using a second pre-emphasis coefficient, and the receive end of the SerDes link of the communication device performs compensation for a received serial signal by using a second pre-equalization coefficient; or if the current ambient temperature falls within a low temperature range, adjusting the SerDes parameter of the communication device to be a third SerDes parameter, so that the transmit end of the SerDes link of the communication device pre-processes a to-be-sent serial signal by using a third pre-emphasis coefficient, and the receive end of the SerDes link of the communication device performs compensation for a received serial signal by using a third pre-equalization coefficient.

Further, referring to FIG. 2, if the current ambient temperature falls within a first buffer, and an ambient temperature value acquired during previous polling is greater than or equal to Tba; or if the current ambient temperature falls within a second buffer, and an ambient temperature value acquired during previous polling is less than or equal to Tca, the SerDes parameter of the communication device is adjusted to be the second SerDes parameter. If the current ambient temperature falls within the first buffer, and an ambient temperature value acquired during previous polling is less than Tba; or if the current ambient temperature falls within the second buffer, and an ambient temperature value acquired during previous polling is greater than Tca, the SerDes parameter of the communication device is not adjusted.

Figure 3:
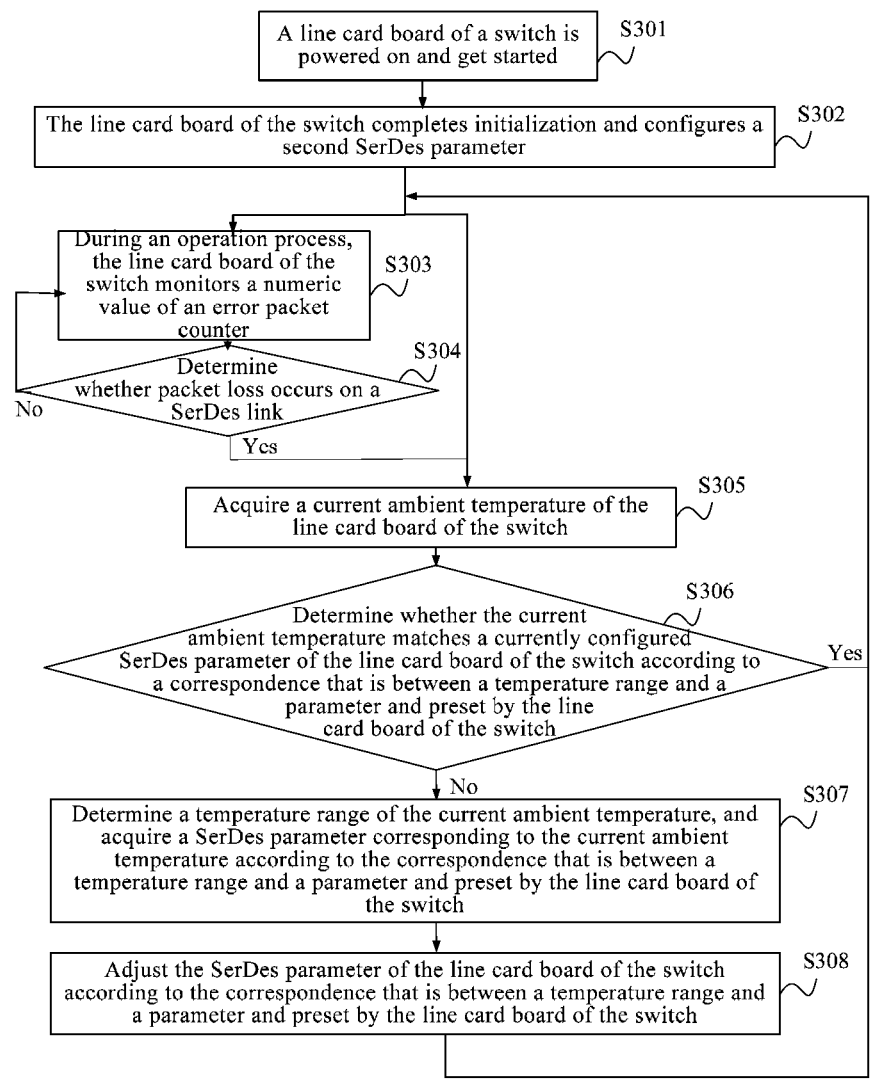
FIG. 3 is a flowchart of another parameter adjustment method according to an embodiment of the application.

FIG. 3 is a flowchart of another parameter adjustment method according to an embodiment of the application. As shown in FIG. 3, the embodiment is described by using an example in which the parameter adjustment method is applicable to a line cardboard of a switch including a SerDes link, where a current ambient temperature of the line cardboard of the switch may be acquired in two manners, including the following steps:

S301: The line cardboard of the switch is powered on and get started.

S302: The line cardboard of the switch completes initialization and configures a second SerDes parameter.

S303: During an operation process, the line cardboard of the switch monitors a numeric value of an error packet counter.

S304: Determine whether packet loss occurs on a SerDes link.

If packet loss occurs on the SerDes link, S305 is performed; and if packet loss does not occur on the SerDes link, S303 is performed.

In the embodiment, an example in which an event of packet loss occurs and a SerDes parameter is adjusted by triggering S305 after S303 to S304 are performed is used. Certainly, parameter adjustment may also be performed periodically without performing S303 and S304. After S302 is performed, a timer is configured; after a set period elapses, S305 is triggered, and S305 to S308 are repeatedly performed for parameter adjustment.

S305: Acquire a current ambient temperature of the line cardboard of the switch.

S306: Determine whether the current ambient temperature matches a currently configured SerDes parameter of the line cardboard of the switch according to a correspondence that is between a temperature range and a parameter and preset by the line cardboard of the switch.

If the current ambient temperature matches the SerDes parameter, S303 and S304 are repeatedly performed; or the timer counts time again until the set period elapses, and then S305 is performed.

If the current ambient temperature does not match the SerDes parameter, S307 and S308 are performed.

S307: Determine a temperature range of the current ambient temperature, and acquire a SerDes parameter corresponding to the current ambient temperature according to the correspondence that is between a temperature range and a parameter and preset by the line cardboard of the switch.

S308: Adjust the SerDes parameter of the line cardboard of the switch according to the correspondence that is between a temperature range and a parameter and preset by the line cardboard of the switch.

After the SerDes parameter is adjusted, S303 and S304 are repeatedly performed; or the timer counts time again until the set period elapses, and then S305 is performed.

Figure 4:
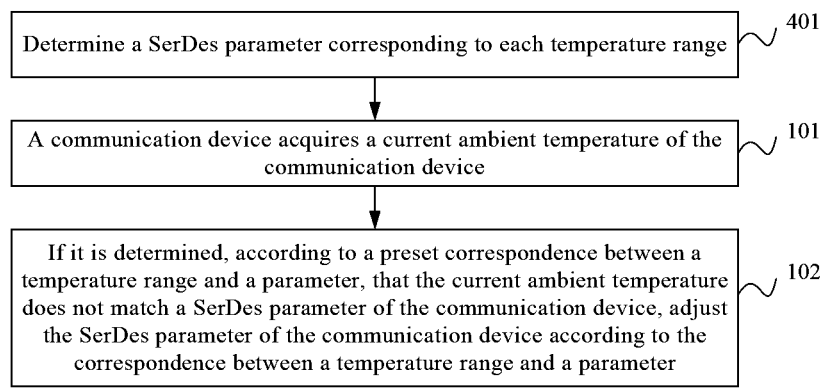
FIG. 4 is a flowchart of still another parameter adjustment method according to an embodiment of the application.

FIG. 4 is a flowchart of still another parameter adjustment method according to an embodiment of the application. As shown in FIG. 4, in the embodiment based on the foregoing embodiment, before the acquiring, by a communication device, a current ambient temperature of the communication device, the parameter adjustment method further includes:

401: Determine a SerDes parameter corresponding to each temperature range.

Parameter adjustment in the application refers to adjustment for a SerDes parameter of the communication device, where the SerDes parameter includes a pre-emphasis coefficient and a pre-equalization coefficient. When the communication device serves as a signal transmit end, a to-be-sent signal is pre-processed by using the pre-emphasis coefficient; and when the communication device serves as a signal receive end, compensation processing is performed for a received signal by using the pre-equalization coefficient.

By using a SerDes link of the communication device, a PRBS test is performed on each one of the high temperature range, the normal temperature range, and the low temperature range by using a plurality of groups of sample SerDes parameters, to: in the plurality of groups of sample SerDes parameters, determine, for the high temperature range, a SerDes parameter with a greatest corresponding error-free code interval and a margin that falls within a set range as the first SerDes parameter; determine, for the normal temperature range, a SerDes parameter with a greatest corresponding error-free code interval and a margin that falls within a set range as the second SerDes parameter; and determine, for the low temperature range, a SerDes parameter with a greatest corresponding error-free code interval and a margin that falls within a set range as the third SerDes parameter.

Specifically, a verification tool is used to verify whether margins of each group of parameters are within a set range, where the set range may be set according to a user requirement. Generally, a higher requirement on a bit error rate indicates a smaller value of a margin. The verification tool may be an eye pattern testing tool (EYESCAN).

In the embodiment, SerDes parameters corresponding to different temperature ranges that are applicable to a communication device are determined in a test stage of the communication device, to ensure that margins of the SerDes parameters corresponding to the communication device including a SerDes link in different temperature environments are the greatest, thereby improving reliability of the SerDes link of the communication device.

Figure 5:
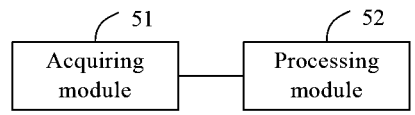
FIG. 5 is a schematic structural diagram of a parameter adjustment apparatus according to an embodiment of the application.

FIG. 5 is a schematic structural diagram of a parameter adjustment apparatus according to an embodiment of the application, where the parameter adjustment apparatus is configured to implement the parameter adjustment method shown in FIG. 1 or FIG. 3 of the application. The apparatus in the embodiment may be integrated into a communication device including a SerDes link, where the communication device may be a switch, a router, a laptop computer, a repeater, or the like. As shown in FIG. 5, the apparatus includes: an acquiring module 51 and a processing module 52, where:

the acquiring module 51 is configured to acquire a current ambient temperature of the communication device; and the processing 52 is configured to: if it is determined, according to a preset correspondence between a temperature range and a parameter, that the current ambient temperature does not match a SerDes parameter of the communication device, adjust the SerDes parameter of the communication device according to the correspondence.

For implementation principles and details of the apparatus in the embodiment, reference may be made to the method embodiment shown in FIG. 1 or FIG. 3 of the application.

In the foregoing embodiment, the correspondence between a temperature range and a parameter includes: a first correspondence, a second correspondence, and a third correspondence, where the first correspondence includes a high temperature range and a first SerDes parameter, the second correspondence includes a normal temperature range and a second SerDes parameter, and the third correspondence includes a low temperature range and a third SerDes parameter.

Optionally, the processing module 52 may be specifically configured to: if the current ambient temperature falls within the high temperature range, adjust the SerDes parameter of the communication device to be the first SerDes parameter; or if the current ambient temperature falls within the normal temperature range, adjust the SerDes parameter of the communication device to be the second SerDes parameter; or if the current ambient temperature falls within the low temperature range, adjust the SerDes parameter of the communication device to be the third SerDes parameter.

Figure 6:
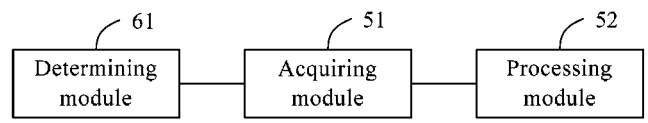
FIG. 6 is a schematic structural diagram of another parameter adjustment apparatus according to an embodiment of the application.

FIG. 6 is a schematic structural diagram of another parameter adjustment apparatus according to an embodiment of the application, where the parameter adjustment apparatus is configured to implement the method shown in FIG. 4 of the application. As shown in FIG. 6, on the basis of FIG. 5, the parameter adjustment apparatus may further include: a determining module 61, configured to: by using a SerDes link of the communication device, perform a pseudo-random binary sequence PRBS test on each one of the high temperature range, the normal temperature range, and the low temperature range by using a plurality of groups of sample SerDes parameters, to: in the plurality of groups of sample SerDes parameters, determine, for the high temperature range, a SerDes parameter with a greatest corresponding error-free code interval and a margin that falls within a set range as the first SerDes parameter; determine, for the normal temperature range, a SerDes parameter with a greatest corresponding error-free code interval and a margin that falls within a set range as the second SerDes parameter; and determine, for the low temperature range, a SerDes parameter with a greatest corresponding error-free code interval and a margin that falls within a set range as the third SerDes parameter.

Further, the acquiring module 51 may be specifically configured to: monitor a packet loss rate of the SerDes link of the communication device; and if the packet loss rate is greater than a set threshold, acquire the current ambient temperature of the communication device.

The apparatus in the embodiment is configured to execute the technical solutions of the foregoing method embodiments, implementation principles and technical effects thereof are similar, and details are not described herein again.

Figure 7:
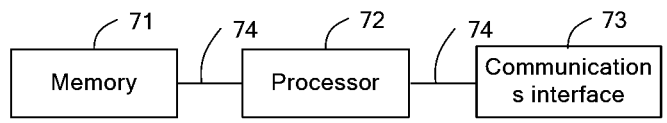
FIG. 7 is a schematic structural diagram of still another parameter adjustment apparatus according to an embodiment of the application.

FIG. 7 is a schematic structural diagram of still another parameter adjustment apparatus according to an embodiment of the application, where the parameter adjustment apparatus is configured to implement any one of the methods shown in FIG. 1 to FIG. 4 in the application. As shown in FIG. 7, the apparatus includes: a memory 71, a processor 72, a communications interface 73, and a bus 74, where the memory 71, the processor 72, and the communications interface 73 are interconnected by using the bus 74.

The memory 71 is configured to store a program. Specifically, the program may include program code, where the program code includes a computer operation instruction. The memory 71 may include a high-speed random access memory (RAM), and may also include a non-volatile memory (non-volatile memory), for example, at least one disk memory.

The communications interface 73 is configured to communicate with another communication device. The communications interface 73 includes a SerDes link interface.

The processor 72 executes the program stored in the memory 71 to implement the parameter adjustment methods according to the embodiments of the application, including:

acquiring a current ambient temperature of a communication device; and if it is determined, according to a preset correspondence between a temperature range and a parameter, that the current ambient temperature does not match a serializer/deserializer SerDes parameter of the communication device, adjusting the SerDes parameter of the communication device according to the correspondence.

The memory 71 is further configured to store the correspondence between a temperature range and a parameter.

Optionally, the correspondence between a temperature range and a parameter includes: a first correspondence, a second correspondence, and a third correspondence, where the first correspondence includes a high temperature range and a first SerDes parameter, the second correspondence includes a normal temperature range and a second SerDes parameter, and the third correspondence includes a low temperature range and a third SerDes parameter.

Further, the processor 72 may be specifically configured to: if the current ambient temperature falls within the high temperature range, adjust the SerDes parameter of the communication device to be the first SerDes parameter; or if the current ambient temperature falls within the normal temperature range, adjust the SerDes parameter of the communication device to be the second SerDes parameter; or if the current ambient temperature falls within the low temperature range, adjust the SerDes parameter of the communication device to be the third SerDes parameter.

On the basis of the foregoing, the processor 72 is further configured to: by using a SerDes link of the communication device, perform a pseudo-random binary sequence PRBS test on each one of the high temperature range, the normal temperature range, and the low temperature range by using a plurality of groups of sample SerDes parameters, to: in the plurality of groups of sample SerDes parameters, determine, for the high temperature range, a SerDes parameter with a greatest corresponding error-free code interval and a margin that falls within a set range as the first SerDes parameter; determine, for the normal temperature range, a SerDes parameter with a greatest corresponding error-free code interval and a margin that falls within a set range as the second SerDes parameter; and determine, for the low temperature range, a SerDes parameter with a greatest corresponding error-free code interval and a margin that falls within a set range as the third SerDes parameter. The memory 71 stores determination results.

When the processor 72 executes an operation of acquiring the current ambient temperature of the communication device, the following may be specifically executed: monitoring a packet loss rate of the SerDes link of the communication device; and if the packet loss rate is greater than a set threshold, acquiring the current ambient temperature of the communication device.

The foregoing processor 72 may be a general-purpose processor, including a central processing unit (CPU), a network processor (NP), or the like; and may also be a digital signal processor (DSP), an application-specific integrated circuit (ASIC), a field programmable gate array (FPGA), or another programmable logical device.

In the embodiment of the application, a current ambient temperature of a communication device including a SerDes link is monitored in real time, and a SerDes parameter of the communication device is adjusted according to the current ambient temperature and a preset correspondence between a temperature range and a parameter, thereby improving reliability of the SerDes link of the communication device, and reducing a bit error rate of the SerDes link.

The apparatus in the embodiment is configured to execute the technical solutions of the foregoing method embodiments. For unspecified details, reference may be made to any one of the methods shown in FIG. 1 to FIG. 4 of the application, which are not described herein again.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the application other than limiting the application. Although the application is described in detail with reference to the foregoing embodiments, persons of ordinary skill in the art should understand that they may still make modifications to the technical solutions disclosed in the foregoing embodiments or make equivalent replacements to some or all technical features thereof, without departing from the scope of the technical solutions of the embodiments of the application.

What is claimed is:

1. A parameter adjustment method, applicable to a communication device comprising a serializer/deserializer (SerDes) link, wherein the method comprises:
    monitoring, by the communication device, a packet loss rate of the SerDes link;
    if the packet loss rate is greater than a set threshold, acquiring, by the communication device, a current ambient temperature of the communication device; and
    if it is determined, according to a preset correspondence between a temperature range and a parameter, that the current ambient temperature does not match a SerDes parameter of the communication device, adjusting the SerDes parameter of the communication device according to the preset correspondence,
    wherein the SerDes parameter of the communication device comprises a pre-emphasis coefficient and a pre-equalization coefficient, a transmit end of the SerDes link pre-processes a to-be-sent serial signal by using the pre-emphasis coefficient, and a receive end of the SerDes link performs compensation for a received serial signal by using the pre-equalization coefficient.

2. The method according to claim 1, wherein the preset correspondence between the temperature range and the parameter comprises: a first correspondence, a second correspondence, and a third correspondence, wherein the first correspondence comprises a high temperature range and a first SerDes parameter, the second correspondence comprises a normal temperature range and a second SerDes parameter, and the third correspondence comprises a low temperature range and a third SerDes parameter, wherein one buffer exists between the low temperature range and the normal temperature range, and another buffer exists between the normal temperature range and the high temperature range.

3. The method according to claim 2, wherein adjusting the SerDes parameter of the communication device according to the preset correspondence comprises:
    if the current ambient temperature falls within the high temperature range, adjusting the SerDes parameter of the communication device to be the first SerDes parameter, wherein the first SerDes parameter comprises a first pre-emphasis coefficient and a first pre-equalization coefficient; or
    if the current ambient temperature falls within the normal temperature range, adjusting the SerDes parameter of the communication device to be the second SerDes parameter, wherein the second SerDes parameter comprises a second pre-emphasis coefficient and a second pre-equalization coefficient; or
    if the current ambient temperature falls within the low temperature range, adjusting the SerDes parameter of the communication device to be the third SerDes parameter, wherein the third SerDes parameter comprises a third pre-emphasis coefficient and a third pre-equalization coefficient.

4. The method according to claim 2, wherein before acquiring the current ambient temperature of the communication device further comprises:

by using the SerDes link of the communication device, performing a pseudo-random binary sequence PRBS test on each one of the high temperature range, the normal temperature range, and the low temperature range by using a plurality of groups of sample SerDes parameters, to: in the plurality of groups of sample SerDes parameters, determine, for the high temperature range, the SerDes parameter with a greatest corresponding error-free code interval and a margin that falls within a set range as the first SerDes parameter; determine, for the normal temperature range, the SerDes parameter with a greatest corresponding error-free code interval and a margin that falls within a set range as the second SerDes parameter; and determine, for the low temperature range, the SerDes parameter with a greatest corresponding error-free code interval and a margin that falls within a set range as the third SerDes parameter.

5. A parameter adjustment apparatus, applicable to a communication device comprising a serializer/deserializer (SerDes) link, wherein the apparatus comprises:
an acquiring module configured to monitor a packet loss rate of the SerDes link of the communication device; and if the packet loss rate is greater than a set threshold, acquire a current ambient temperature of the communication device; and
a processing module configured to: if it is determined, according to a preset correspondence between a temperature range and a parameter, that the current ambient temperature does not match a SerDes parameter of the communication device, adjust the SerDes parameter of the communication device according to the preset correspondence,
wherein the SerDes parameter of the communication device comprises a pre-emphasis coefficient and a pre-equalization coefficient, a transmit end of the SerDes link pre-processes a to-be-sent serial signal by using the pre-emphasis coefficient, and a receive end of the SerDes link performs compensation for a received serial signal by using the pre-equalization coefficient.

6. The apparatus according to claim 5, wherein the preset correspondence between the temperature range and the parameter comprises:
a first correspondence, a second correspondence, and a third correspondence, wherein the first correspondence comprises a high temperature range and a first SerDes parameter, the second correspondence comprises a normal temperature range and a second SerDes parameter, and the third correspondence comprises a low temperature range and a third SerDes parameter,
wherein one buffer exists between the low temperature range and the normal temperature range, and another buffer exists between the normal temperature range and the high temperature range.

7. The apparatus according to claim 6, wherein the processing module is configured to:
if the current ambient temperature falls within the high temperature range, adjust the SerDes parameter of the communication device to be the first SerDes parameter, wherein the first SerDes parameter comprises a first pre-emphasis coefficient and a first pre-equalization coefficient; or
if the current ambient temperature falls within the normal temperature range, adjust the SerDes parameter of the communication device to be the second SerDes parameter, wherein the second SerDes parameter comprises a second pre-emphasis coefficient and a second pre-equalization coefficient; or
if the current ambient temperature falls within the low temperature range, adjust the SerDes parameter of the communication device to be the third SerDes parameter, wherein the third SerDes parameter comprises a third pre-emphasis coefficient and a third pre-equalization coefficient.

8. The apparatus according to claim 6, further comprising:
a determining module, configured to: by using the SerDes link of the communication device, perform a pseudo-random binary sequence PRBS test on each one of the high temperature range, the normal temperature range, and the low temperature range by using a plurality of groups of sample SerDes parameters, to: in the plurality of groups of sample SerDes parameters, determine, for the high temperature range, the SerDes parameter with a greatest corresponding error-free code interval and a margin that falls within a set range as the first SerDes parameter; determine, for the normal temperature range, the SerDes parameter with a greatest corresponding error-free code interval and a margin that falls within a set range as the second SerDes parameter; and determine, for the low temperature range, the SerDes parameter with a greatest corresponding error-free code interval and a margin that falls within a set range as the third SerDes parameter.

* * * * *